(12) United States Patent
Jung

(10) Patent No.: US 7,453,996 B2
(45) Date of Patent: Nov. 18, 2008

(54) BILLING METHOD FOR TELECOMMUNICATION SERVICE BASED ON FIXED FEE

(75) Inventor: Il-Hyung Jung, Kyoungki-do (KR)

(73) Assignee: KT Corporation, Kyoungki-do (KR)

( * ) Notice: Subject to any disclaimer, the term of this patent is extended or adjusted under 35 U.S.C. 154(b) by 39 days.

(21) Appl. No.: 10/533,247

(22) PCT Filed: Oct. 31, 2003

(86) PCT No.: PCT/KR03/02325

§ 371 (c)(1),
(2), (4) Date: Oct. 7, 2005

(87) PCT Pub. No.: WO2004/040893

PCT Pub. Date: May 13, 2004

(65) Prior Publication Data

US 2006/0106736 A1  May 18, 2006

(30) Foreign Application Priority Data

Oct. 31, 2002 (KR) .................. 10-2002-0067284
Sep. 29, 2003 (KR) .................. 10-2003-0067332

(51) Int. Cl.
*H04M 15/00* (2006.01)

(52) U.S. Cl. .................. 379/114.01; 379/114.03; 379/114.09; 379/114.18; 379/121.02

(58) Field of Classification Search .............. 379/111, 379/112.06, 112.07, 112.08, 114.01, 114.03, 379/114.05, 114.06, 114.09, 114.12, 114.18, 379/121.02, 127.05; 455/405–409
See application file for complete search history.

(56) References Cited

U.S. PATENT DOCUMENTS

| 5,995,822 | A  | * | 11/1999 | Smith et al. ................. 455/406 |
| 2004/0043754 | A1 | * | 3/2004 | Whewell .................... 455/408 |
| 2005/0033691 | A1 | * | 2/2005 | Whewell et al. ............ 705/40 |

FOREIGN PATENT DOCUMENTS

| JP | 08-317089 | 11/1996 |
| JP | 2001-327076 | 11/2001 |
| JP | 2001-333060 | 11/2001 |
| KR | 10-2001-0057374 A | 7/2001 |
| WO | WO 01/67578 | 9/2001 |

OTHER PUBLICATIONS

International Search Report for International Application No. PCT/KR2003/002325 mailed on Feb. 16, 2004.

* cited by examiner

*Primary Examiner*—Binh K. Tieu
(74) *Attorney, Agent, or Firm*—Marshall Gerstein & Borun LLP

(57) ABSTRACT

Provided is a billing method for telecommunication service based on fixed fee according to user's usage time. The method includes the steps of: estimating reference time according to user's usage time of the previous term; estimating guarantee time; reading user's usage time of this term; and billing telecommunication service fare according to the reference time and the guarantee time.

16 Claims, 3 Drawing Sheets

BILLING METHOD FOR TELECOMMUNICATION SERVICE BASED ON FIXED FEE

TECHNICAL FIELD

The present invention relates to a billing method of a wired/wireless telecommunication system; and, more particularly, to a billing method of a flat-rate telecommunication system.

BACKGROUND ART

A flat-rate telecommunication service is a system where a subscriber can use a telecommunication service with unlimited minutes at a fixed cost. A billing system opposite to the flat-rate system is a minute-rate system, where the subscriber is billed based on the minutes for which he/she uses the telecommunication service.

The flat-rate telecommunication system has an advantage that it can relieve subscribers from the burden of telecommunication service charge by charging them only a predetermined amount of money. However, there is a problem that it is hard to determine a flat rate of a telecommunication service that both service provider and subscribers can accept. Conventional methods for charging a flat rate do not reflect the subscriber's service usage history at all and charge all the subscribers the same flat rate for the service, collectively.

To solve the problem, researchers are studying to develop a method for calculating a flat rate based on the previous telecommunication service usage history of each user. According to the method, different flat rate is imposed to each subscriber and subscribers pay as much as a predetermined flat rate for their using the telecommunication service, no matter how long they use the service.

However, this method also has a problem that the subscriber should pay the determined flat rate, even when the subscriber uses the telecommunication service far shorter than the time of his previous telecommunication service usage history.

This is unreasonable to bill the flat rate, which is higher than the subscriber has actually used, to the subscriber who has used the telecommunication service much less than usual. This problem may cause decrease in the number of subscribers to the telecommunication service.

DISCLOSURE OF INVENTION

It is, therefore, an object of the present invention to provide a method for billing subscribers for a telecommunication service reasonably by calculating reference time based on the subscriber's service usage history, fixing a reference rate based on the calculated reference time differently according to each subscriber. The billing method of the present invention can calculate the amount that a subscriber should pay by adopting a reference time calculating module and a flat rate application time calculating module in a telecommunication billing system.

Other objects and advantages can be easily understood by those skilled in the art of the present invention from the drawings, detailed description and claims of the present patent application.

In accordance with one aspect of the present invention, there is provided a method for calculating a telecommunication service charge of a user based on a predetermined length of time for which the user uses the telecommunication service, including the steps of: a) calculating a representative value of telecommunication service use time for a predetermined period statistically and determining the representative value as reference time of the user; b) calculating flat rate application time based on the a predetermined additional amount, the flat rate application time being a period during which flat rate is applied after the reference time; c) reading the user's telecommunication service subscription time of this month from a database for storing the user's telecommunication service usage history; and d) imposing a first service charge if the telecommunication service use time of the user is shorter than the reference time, imposing a second service charge if the telecommunication service use time of the user is longer than the reference time and shorter than the flat rate application time, and imposing a third service charge if the telecommunication service use time of the user is longer than the flat rate application time.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Figure 1:
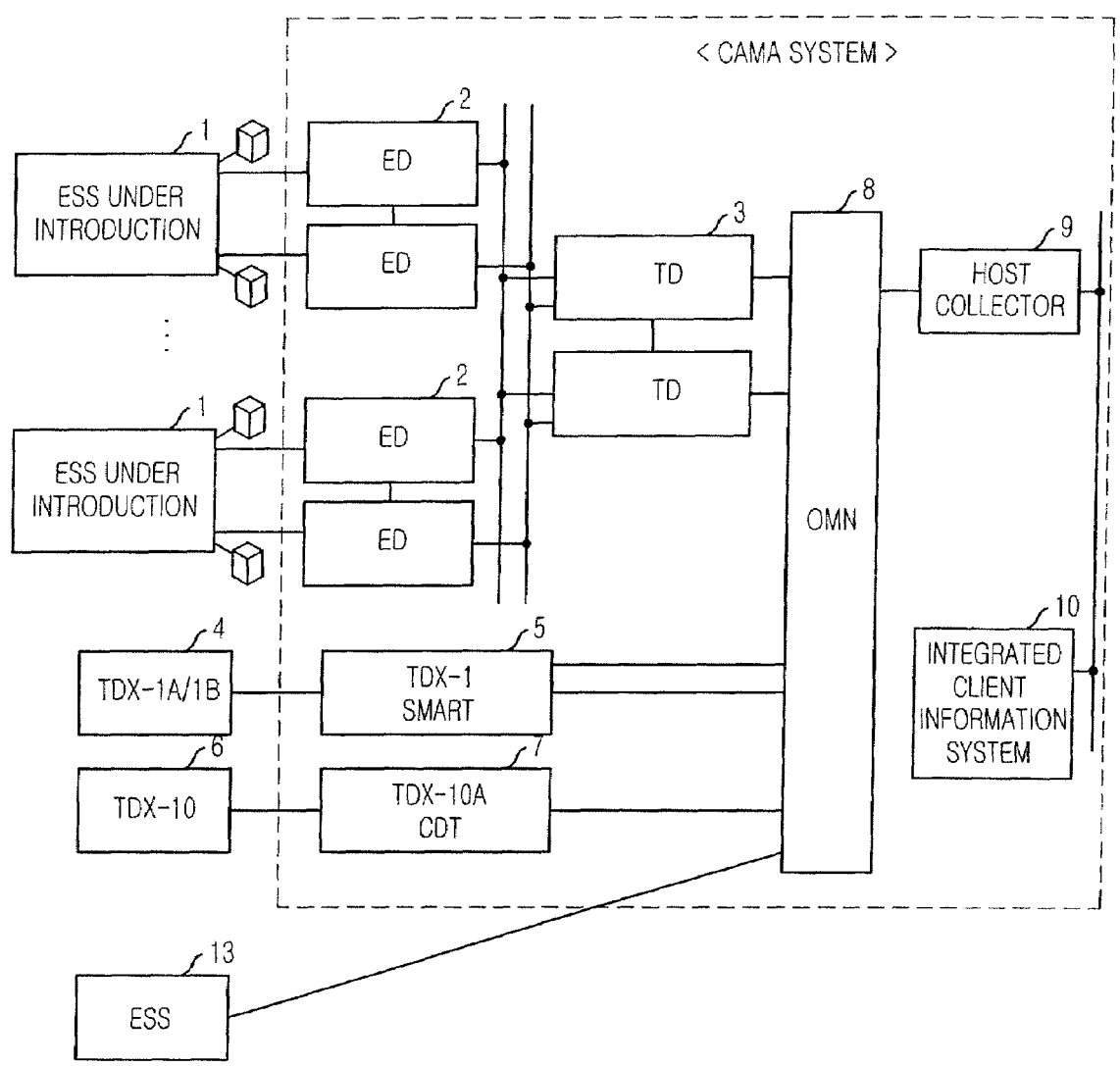
FIG. 1 is a block diagram illustrating a CAMA system in accordance with an embodiment of the present invention.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether of not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

Other objects and aspects of the invention will become apparent from the following description of the embodiments with reference to the accompanying drawings, which is set forth hereinafter.

Herein, an Electronic Switching System (ESS) Centralized Automatic Message Accounting (CAMA) system is described in accordance with an embodiment of the present invention. The ESS CAMA system is managed by an ESS CAMA Centralized Management System (CCMS).

The CAMA system of the present invention includes: a Billing Processing Device of Exchange (BPDE) and a host collector (HC). The BPDE extracts charge data from an ESS and transmits the charge data to the host collector. The host collector controls and verifies the charge data and transmits them to an Integrated Client Information System (ICIS) or a prebilling system.

The BPDE can be categorized according to the type of ESS which extracts charge data. Recently introduced, ESSs, such as S1240, M10CN, N01A, 5ESS (Classic) and the like do not have the function of CAMA. The ESSs under introduction includes an extraction device (ED) and a transmission device (TD). The extraction device extracts charge data and the transmission device transmits and manages charge data. The two devices, the extraction device and the transmission device, are called a billing mediation device (BMD), collectively.

Another type of BPDE is a TDX-1 Software Modification and Administration for Remote TDX (SMART). The SMART extracts and transmits charge data of the TDX-1A/1B/CPS. Yet another type of BPDE is a charge data transmitter (CDT). The charge data extracted in the above-described system are transmitted to the host collector through a duplicated X.25 link to secure reliability, when the CDT is cooperated with an operation management network (OMN). Meanwhile, new ESSs with the functions of charge extraction and charge transmission, which is a function of CAMA, installed therein are connected to the host collector, directly.

Referring to FIG. 1, structures of the CAMA system and the CCMS are described. The CCMS manages the state of the CAMA system. The CAMA system includes: ESSs under introduction 1; an ESS of TDX-1 series 4; an ESS of TDX-10A 6; a CAMA system which is connected with the ESSs 1, 4 and 6 and performs billing process and management; a CCMS which is connected with the CAMA system and detects the state and errors of the CAMA system; and a new ESS 13. The new ESS 13 is connected with the host collector 9 directly through the OMN 8 in the CAMA system and transmits the charge data.

The CAMA system includes: extraction devices (ED) 2, transmission devices (TD) 3, a SMART 5, a charge data transmitter (CDT) 7, an operation management network (OMN) 8, a host collector (HC) 9, and an integrated client information system 10.

The extraction devices 2 are connected to the ESS 1 under introduction and extract charge data generated in the ESS 1 under introduction. The transmission devices 3 administrate the charge data extracted in the extraction device 2 and transmit the charge data to the OMN 8.

The SMART 5 is connected to the ESS of TDX-1 series 4, extracts the charge data generated in the ESS of TDX-1 series 4, transmits the extracted charge data to the OMN 8 and manages the charge data. The charge data transmitter (CDT) 7 is connected to the ESS of TDX-10A 6, extracts the charge data generated in the ESS of TDX-10A 6, transmits the extracted charge data to the OMN 8 and manages the charge data.

The operation management network (OMN) 8 is connected with the respective ESSs 3, 5 and 7. The host collector 9 collects and verifies the charge data transmitted through the OMN 8. The integrated client information system 10 manages the charge data verified in the host collector 9 integratedly, and calculates exact amount of charge. So, the integrated client information system 10 includes a charge database for storing service usage information, which includes subscriber information, service use time, and charge information.

Figure 2:
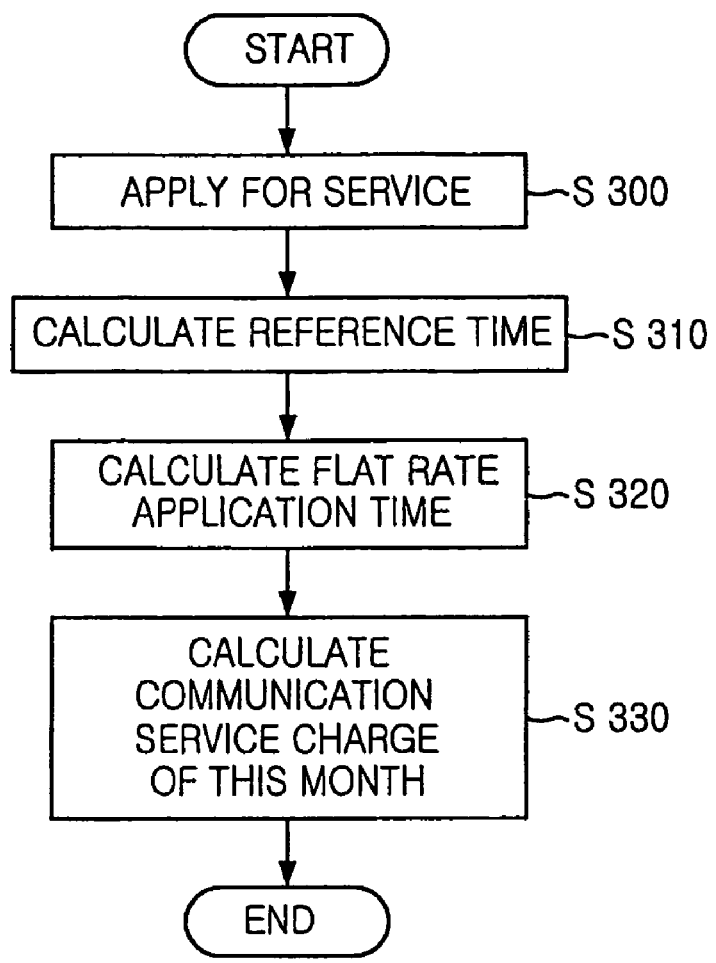
FIG. 2 is a flowchart showing a billing process in the telecommunication system in accordance with a preferred embodiment of the present invention.

FIG. 2 is a flowchart showing a billing process in the telecommunication system in accordance with a preferred embodiment of the present invention. Hereafter, the charge for using a telecommunication service is described on a time basis. However, it is obvious to those skilled in the art that the present invention can be applied on a metric basis, too.

Referring to FIG. 2, at step S300, a client who wants the billing method of the present invention for a telecommunication service applies for the billing service to an administrator of the telecommunication system. The application for the telecommunication service can be submitted through a wired/wireless Internet telecommunication network or an automatic response system (ARS) or by phone call.

The application for the telecommunication service is received and the subscriber, or the user of the telecommunication service, is registered in the integrated client information system 10. Then, the charge for using the telecommunication service is calculated in accordance with the present invention.

At step S310, a reference time for the subscriber is calculated after registration. At step S320, a flat rate application time for the subscriber is calculated. The reference time is a representative value obtained statistically, For example, an average of the time for which the subscriber has used the telecommunication service for recent six months may be the reference time.

The flat rate application time is time for which flat rate is applied based on a predetermined additional after the reference time. The flat rate application time also can be calculated differently according to each subscriber. The reference time and the flat rate application time are calculated by using a separate calculation module in the CAMA system and referring to the subscriber's record of using the telecommunication service.

At step S330, after the reference time and the flat rate application time are calculated, the service charge of the month to be charged to the subscriber is calculated based on them.

Figure 3:
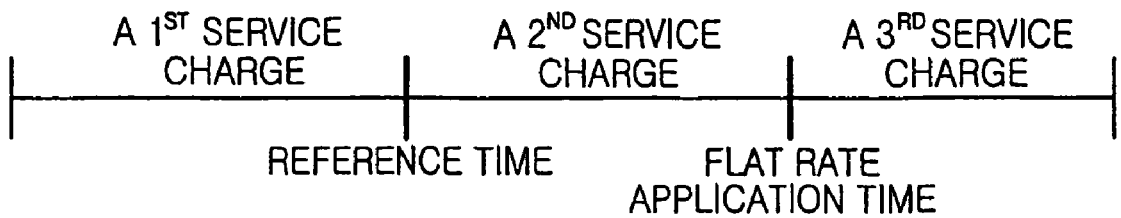
FIG. 3 is a diagram showing a method for calculating telecommunication service charge, which is shown in FIG. 2.

FIG. 3 is a diagram showing a method for calculating telecommunication service charge, which is shown in FIG. 2. The service charge for using the telecommunication service is divided into a first service charge, a second service charge, and a third service charge based on the reference time and the flat rate application time.

If the subscriber's service use time of the month is shorter than the reference time calculated at the step S310 of FIG. 2, the first service charge is billed. If the subscriber's service use time of the month is longer than the reference time, the second service charge, which is a fixed rate, is billed to the subscriber.

The different service charges, i.e., the first service charge and the second service charge, are determined in this invention, because it may be unreasonable to bill the subscriber uniformly if the user did not use the telecommunication service far shorter than the reference time on a certain month.

Meanwhile, the flat rate application time is time for which the flat-rate telecommunication service is secured after the reference time based on the predetermined amount of additional amount. After the reference time, the subscriber can use the telecommunication service at the flat rate by paying the additional amount. However, since allowing the flat rate unlimitedly is unfavorable for the telecommunication service provider, the flat rate application time is set.

In accordance with another embodiment of the present invention, it is possible to make the flat rate application time unlimited and have the subscriber pay a predetermined amount for the unlimited flat rate application time so that the subscriber could use the telecommunication service at a flat rate without any time limit after the reference time.

The first service charge may be one among a service charge for using the telecommunication service in correspondence to the reference time, a time rate corresponding to the telecommunication service use time within the reference time, and a charge obtained by adding the additional amount to the time rate corresponding to the telecommunication use time within the reference time.

The second service charge is a flat rate obtained by adding the additional amount to the service charge for using the telecommunication service for the reference time. The third service charge is a service charge obtained by adding the additional amount to the time rate corresponding to the subscriber's telecommunications service use time.

Figure 4:
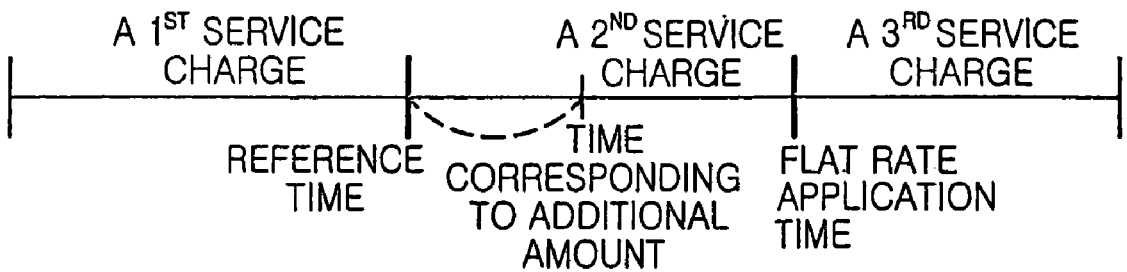
FIG. 4 is a diagram showing a method for calculating telecommunication service charge, which is shown in FIG. 2, in accordance with another embodiment of the present invention.

FIG. 4 is a diagram showing a method for calculating telecommunication service charge, which is shown in FIG. 2, in accordance with another embodiment of the present invention.

In this embodiment, the service charge is calculated in the same was as FIG. 3 just except the calculation of the second service charge. For example, if the subscriber uses the telecommunications service longer than the reference time and shorter than the time corresponding to the additional amount, the service charge is billed to the subscriber as much as the time the subscriber has used the telecommunication service. If the subscriber uses the telecommunication service more than the time corresponding to the additional amount and less than the flat rate application time, the subscriber is billed with an amount obtained by adding the additional amount to the service charge for using the telecommunication service for the reference time.

Imposing the second service charge is determined based on the time corresponding to the time corresponding to the additional amount. This is to calculate and bill a user more reasonable service charge, when the subscriber uses the telecommunication service longer than the reference time but less than the time corresponding to the additional amount. During the time period, the subscriber is billed for the telecommunication service on a time basis, not on the flat rate.

In accordance with another embodiment of the present invention, it is possible to fix the additional amount differently according to the reference time of each user. In other words, the amount of the additional amount is fixed differently according to the length of the reference time. Tables 1 and 2 exemplify the additional amount according to reference time.

TABLE 1

| | Reference Time | | | | |
|---|---|---|---|---|---|
| | (0, 20) | (20, 30) | (30, 40) | (40, 50) | (50, ∞) |
| Additional Amount (Won) | 10,000 | 15,000 | 20,000 | 25,000 | 30,000 |

TABLE 2

| | Reference Time | | | | |
|---|---|---|---|---|---|
| | (0, 20) | (20, 30) | (30, 40) | (40, 50) | (50, ∞) |
| Additional Amount (Won) | 30,000 | 25,000 | 20,000 | 15,000 | 10,000 |

In Table 1, the additional amount is determined in proportion to the reference time. In Table 2, the additional amount is determined in inverse proportion to the reference time.

Also, if the subscriber is an updated subscriber for an $i^{th}$ service period, the additional amount can be calculated based on Equation 1 below.

$$\text{additional amount for } i^{th} \text{ service period} = \frac{\text{additional amount for } (i\text{-}1)^{th} \text{ service period} \times \text{monthly average use time for } (i\text{-}1)^{th} \text{ service period}}{\text{reference time for } (i\text{-}1)^{th} \text{ service period}} \quad \text{Equation 1}$$

It is desirable to reflect the monthly average use time for an $(i-1)^{th}$ service period on the determination of the reference time. This is because it is most reasonable for the telecommunication service provider to determine the reference time for an $i^{th}$ service period based on the subscriber's monthly average use time of an $(i-1)^{th}$ service period.

For example, if the monthly service use time of the $(i-1)^{th}$ service period lies between 0 and the flat rate application time, the reference time of the $i^{th}$ service period is determined as the monthly average use time. If the monthly service use time of the $(i-1)^{th}$ service period comes between the flat rate application time and unlimited time ($\infty$), the reference time of the $i^{th}$ service period is determined as the monthly average use time.

The billing method of the present invention is reasonable to both users and telecommunication system provider by calculating telecommunication service charge differently according to each user based on the reference time and flat rate application time of each user. Particularly, the reasonable billing system, which is different from the conventional flat-rate system, will draw more subscribers to the telecommunication service and, eventually, lead to successful business. In addition, since the billing system of the present invention calculates and provides reasonable reference time to updated subscribers, it can maintain the service subscribers continuously.

While the present invention has been described with respect to certain preferred embodiments, it will be apparent to those skilled in the art that various changes and modifications may be made without departing from the scope of the invention as defined in the following claims.

What is claimed is:

1. A method for calculating a telecommunication service charge of a user based on a predetermined length of time for which the user uses the telecommunication service, comprising the steps of:
   a) calculating reference time of the user based on telecommunication service use time for a predetermined period;
   b) calculating flat rate application time based on the predetermined additional amount, the flat rate application time being a period during which flat rate is applied after the reference time;
   c) reading the user's telecommunication service subscription time of this month from a database for storing the user's telecommunication service usage history; and
   d) imposing a first service charge if the telecommunication service use time of the user is shorter than the reference time, imposing a second service charge if the telecommunication service use time of the user is longer than the reference time and shorter than the flat rate application time, and imposing a third service charge if the telecommunication service use time of the user is longer than the flat rate application time,
   wherein if the user is an updated subscriber for an ith service period, the additional amount is calculated based on an equation as:

$$\text{additional amount for } i^{th} \text{ service period} = \frac{\text{additional amount for } (i\text{-}1)^{th} \text{ service period} \times \text{monthly average use time for } (i\text{-}1)^{th} \text{ service period}}{\text{reference time for } (i\text{-}1)^{th} \text{ service period}}.$$

2. The method as recited in claim 1, wherein the first service charge is a service charge corresponding to the reference time.

3. The method as recited in claim 2, wherein the second service charge is an amount obtained by adding the additional amount to the service charge corresponding to the reference time.

4. The method as recited in claim 3, wherein the flat rate application time is unlimited time if the user pays the additional amount.

5. The method as recited in claim 3, wherein the third service charge is an amount obtained by adding the additional amount to a time rate corresponding to the telecommunication service use time.

6. The method as recited in claim 2, wherein the second service charge is an amount obtained by adding the additional amount to the service charge corresponding to the reference time.

7. The method as recited in claim 6, wherein the third service charge is an amount obtained by adding the additional amount to a time rate corresponding to the time for which the user used the telecommunication service.

8. The method as recited in claim 6, wherein the flat rate application time is unlimited time if the user pays the additional amount.

9. The method as recited in claim 1, wherein if the user's telecommunication service use time is longer than the reference time and shorter than time corresponding to the additional amount, the second service charge is a time rate corresponding to the telecommunication service use time; and
   if the user's telecommunication service use time is longer than the time corresponding to the additional amount and shorter than the flat rate application time, the second service charge is an amount obtained by adding the additional amount to the service charge corresponding to the reference time.

10. The method as recited in claim 9, wherein the third service charge is an amount obtained by adding the additional amount to a time rate corresponding to the user's telecommunication service use time.

11. The method as recited in claim 9, wherein the flat rate application time is unlimited time if the user pays the additional amount.

12. The method as recited in claim 1, wherein if the user's telecommunication service use time is longer than the reference time and shorter than time corresponding to the additional amount, the second service charge is a time rate corresponding to the telecommunication service use time; and
   if the user's telecommunication service use time is longer than the time corresponding to the additional amount and shorter than the flat rate application time, the second service charge is an amount obtained by adding the additional amount to the service charge corresponding to the reference time.

13. The method as recited in claim 12, wherein the third service charge is an amount obtained by adding the additional amount to a time rate corresponding to the user's telecommunication service use time.

14. The method as recited in claim 12, wherein the flat rate application time is unlimited time if the user pays the additional amount.

15. The method as recited in claim 1, wherein the additional amount is determined based on the reference time of each user.

16. The method as recited in claim 1, wherein if the user is an updated subscriber for an $i^{th}$ service period and the user's monthly average use time of an $(i-1)^{th}$ service period comes between 0 and the flat rate application time, the monthly average use time of the $(i-1)^{th}$ service period is determined as the reference time; and
   if the user's monthly average use time of the $(i-1)^{th}$ service period comes between flat rate application time and the unlimited time ($\infty$), the monthly average use time of the $(i-1)^{th}$ service period is determined as the reference time.

* * * * *